March 16, 1926.
K. BUSCH
1,576,570
EMERGENCY WHEEL AND NONSKIDDING DEVICE
Filed Sept. 30, 1925    2 Sheets-Sheet 1
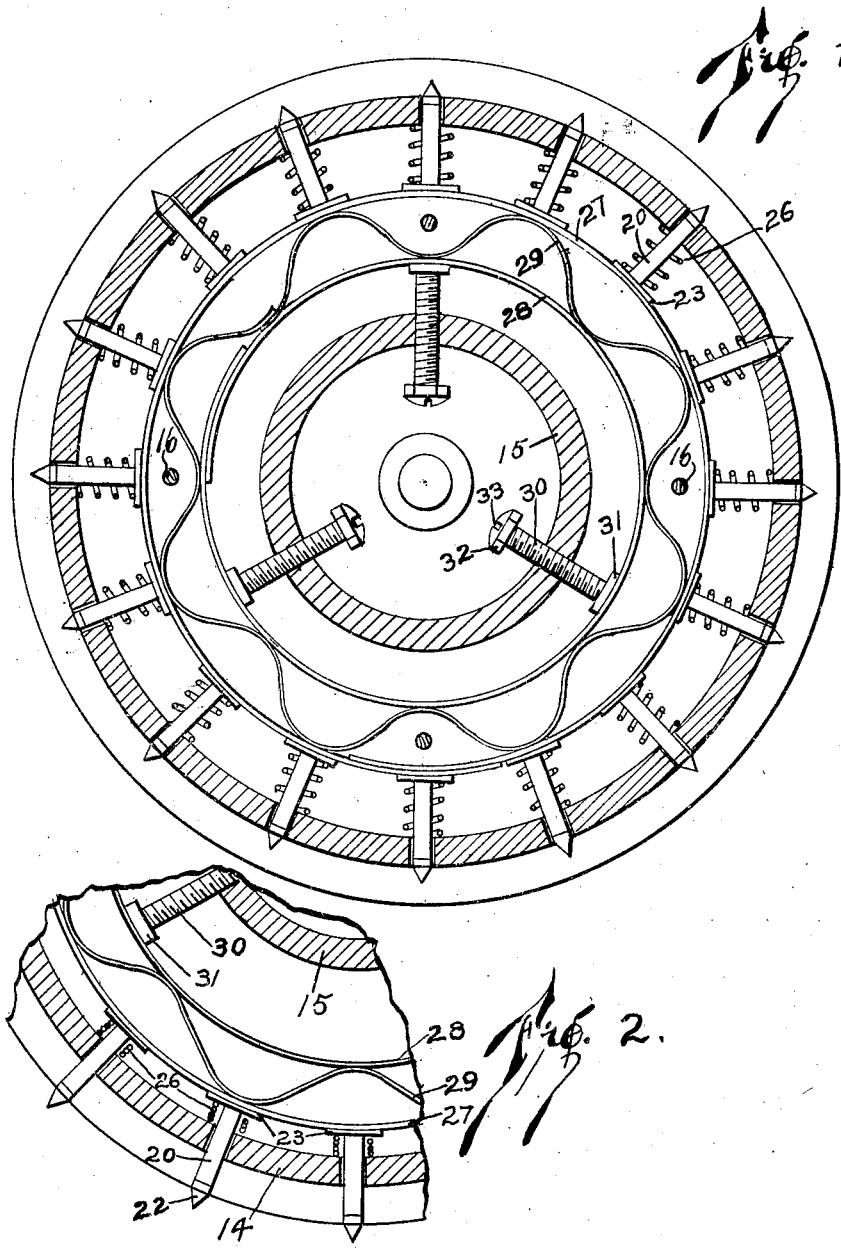
WITNESSES
INVENTOR
KASIMIR BUSCH
BY
ATTORNEY March 16, 1926.
K. BUSCH
1,576,570
EMERGENCY WHEEL AND NONSKIDDING DEVICE
Filed Sept. 30, 1925    2 Sheets-Sheet 2
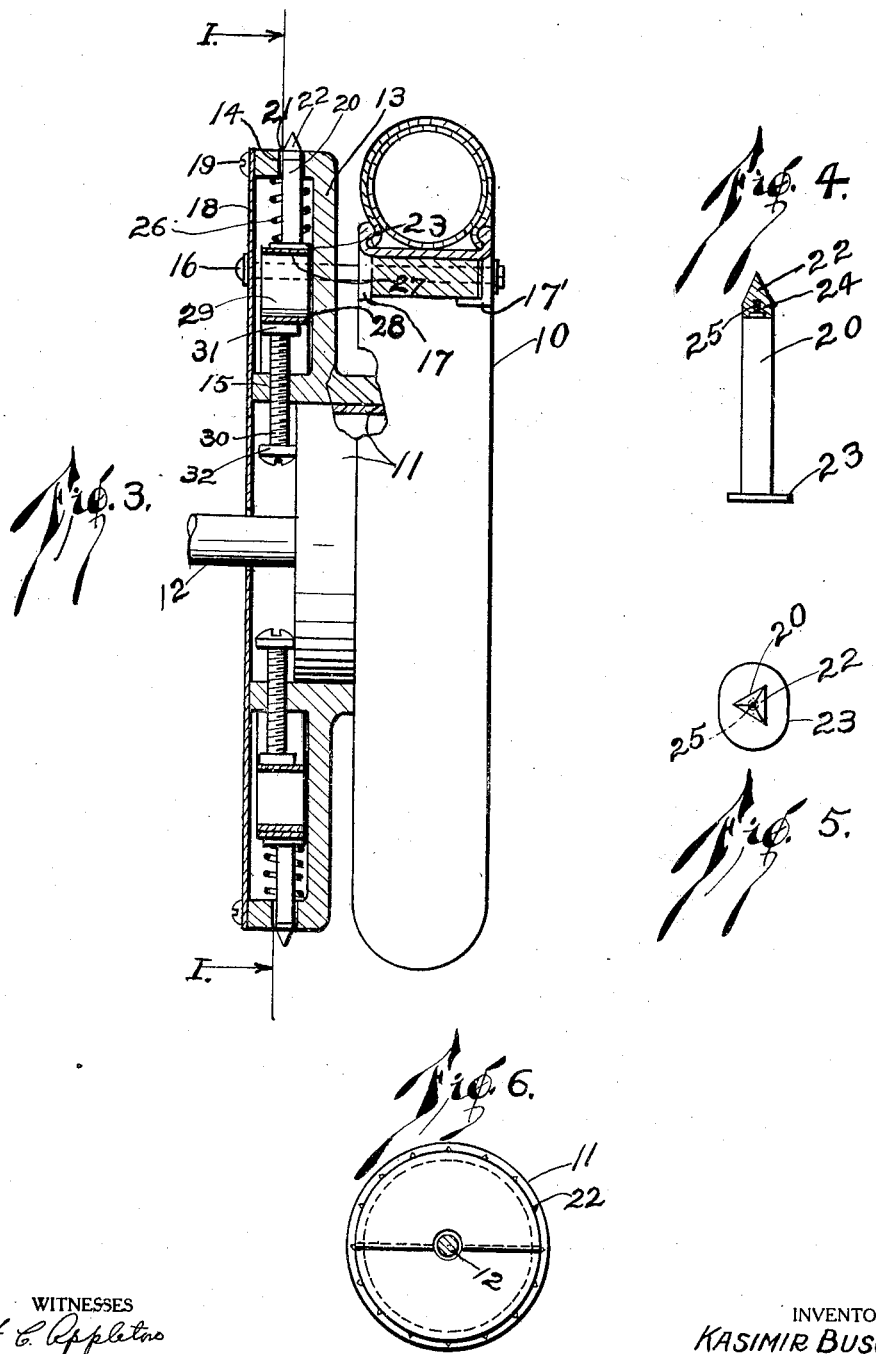
WITNESSES
INVENTOR
KASIMIR BUSCH
ATTORNEY Patented Mar. 16, 1926.

1,576,570

UNITED STATES PATENT OFFICE.

KASIMIR BUSCH, OF CHICAGO, ILLINOIS.

EMERGENCY WHEEL AND NONSKIDDING DEVICE.

Application filed September 30, 1925. Serial No. 59,489.

*To all whom it may concern:*

Be it known that I, KASIMIR BUSCH, a citizen of the United States, and a resident of the city of Chicago, county of Cook, and State of Illinois, have invented new and useful Improvements in an Emergency Wheel and Nonskidding Device, of which the following is a specification.

My invention relates to an emergency wheel and nonskidding device, and has for its principal object to provide an improved construction of this kind which will be durable and highly efficient, and in which the device is adapted to take the place of a wheel whenever the tire is flat, and is also adapted to act as a non-skidding device.

Other objects will appear hereinafter.

The invention consists in the combination and arrangements of parts hereinafter described and claimed.

The invention will be best understood by reference to the accompanying drawings forming a part of this specification and in which, Fig. 1 is a vertical sectional view of the invention taken substantially on line 1—1 of Fig. 3;

Fig. 2 is a fragmentary view of the invention with the road engaging or antiskid elements in their extended position;

Fig. 3 is an edge view of a wheel showing the invention in position thereon and in section;

Fig. 4 is an elevational view, partly in section, of one of the non-skidding elements;

Fig. 5 is a top plan view of said element, and

Fig. 6 is a reduced side elevational view of the invention mounted in position on a wheel.

In the drawings I have illustrated one form of my invention mounted in position on a wheel 10 provided with a brake band box or housing 11 and with an axle 12.

My improved form of construction comprises a circular housing or casing including a disk member 13 having an integral flange 14 at its outer end and being provided with an annular flange 15 inward of the flange 14 and providing an opening for receiving and snugly resting upon the brake band box 11. The device is preferably fastened in position by means of bolts 16, extending through the device and through the inner and outer rim lugs 17 and 17', respectively, and a circular cover plate 18 is fastened to the flange 14, as with screws 19 or the like, thus providing a casing or housing, as shown.

Non-skidding elements or plungers 20 are mounted to move through openings 21 in flange 14, and each element is provided with a removable head 22 at one end and a seat or shoulder 23 at the other end (as best shown in Figs. 4 and 5). Said head is preferably formed triangular in cross section and provided with a threaded socket 24 for receiving a threaded stem 25 on element 20. A coiled spring 26 is mounted on element 20, between seat 23 and flange 14, and automatically urges the element 20 inward into position shown in Fig. 1. An outer split ring 27 of resilient material abuts against the seats or shoulders 23 of elements 20, and a similar split ring 28 of resilient material is mounted inward of ring 27 and concentric therewith, while a curved or waved spring member 29, which preferably also has a split and overlapping end connection, is mounted between and engages said rings 27 and 28, and is adapted to yieldably transfer the outward pressure of ring 28 to ring 27 and therethrough to the non-skidding elements 20.

Threaded members or stems 30 are adjustably mounted in flange 15 and are provided with seats 31 on their outer ends slidably engaging ring 28, said stems 30 having each a head 32 on the inner end, which is preferably arranged angularly so as to be operated by a wrench and also arranged with a groove 33 so as to be operated by a screw driver or suitable element, if preferred.

It is apparent that by actuating or turning stems 30 outwardly, the ring 28 will yieldably force member 29 against ring 27 and thereby force the elements or plungers 20 outwardly in road engaging position, and that when members 30 are moved inwardly, the springs 26 will move the elements 20 inwardly in their inoperative position; and it is also apparent that non-skidding elements 20 are yieldably mounted at all times by means of the split rings and the spring 29, whether said elements 20 are in their operative or in their inoperative position; it is furthermore apparent that when the tires are punctured or flat, that the outer flange or rim 14 of the device is adapted to form a rim for supporting the wheel on the ground and to act as a wheel.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A device of the class described comprising a housing having an annular flange with apertures, elements mounted in said housing to project through said apertures, resilient means for urging said elements outwardly through said apertures to adapt the construction for a non-skidding device, and threaded stems in said housing for actuating said resilient means and elements.

2. A device of the class described comprising a housing having an annular flange with apertures, elements mounted in said housing to project through said apertures, an outer band engaging said elements, an inner band mounted concentric with said first band, resilient means between said bands, and threaded stems in said housing for urging said bands and elements outwardly.

3. A device of the class described comprising a housing having an annular member with apertures, elements mounted in said apertures to project outwardly therefrom, a split band engaging said elements, resilient means for pressing said split band and elements outwardly, and threaded members for actuating said resilient means.

4. A device of the class described comprising a housing having an outer annular member with apertures and an inner annular member with threaded apertures, elements movable outwardly through the apertures in the outer member, resilient means for urging said elements outwardly, and threaded stems in the threaded apertures in the inner annular member for actuating said resilient means.

5. A device of the class described comprising a housing having an outer annular flange with apertures, elements movable outwardly through said apertures, a split band engaging said elements, a split band mounted inwardly of the first band, a split resilient member mounted in wave formation in the space between said bands to resiliently engage both of said bands, and means for moving said bands, member and elements radially.

6. A device of the class described comprising a housing including a disk like member having an inner and an outer annular flange, means for fastening the device to the rim lugs of a wheel and to support the inner flange on the brake band box of said wheel, elements movably mounted in openings in the outer flange, springs for moving said elements inwardly in said flange, concentric bands and resilient means for urging said elements outwardly, and threaded means mounted in the inner flange for actuating said bands, resilient means and elements.

7. A device of the class described comprising a housing having a disk like member with an inner and an outer annular flange, means for fastening the device on the wheel to support the inner flange on the brake band box of said wheel, a disk like cover member mounted on said flanges opposite the first disk like member to provide a housing, elements mounted in openings centrally of the outer flange and housing a split band extending across the inner ends of said elements and adapted to move them outwardly, spring means for moving the elements inwardly, resilient means moving the split band outwardly, and threaded stems mounted in the inner flange for adjustably moving the resilient means and the elements outwardly.

In testimony whereof I have signed my name to this specification.

KASIMIR BUSCH.